(12) United States Patent
Sano et al.

(10) Patent No.: US 10,860,820 B2
(45) Date of Patent: Dec. 8, 2020

(54) SLIP PROCESSING DEVICE, SLIP PROCESSING METHOD AND STORAGE MEDIUM

(71) Applicant: CASIO COMPUTER CO., LTD., Tokyo (JP)

(72) Inventors: Fuminori Sano, Hamura (JP); Koji Nishitani, Ome (JP); Taiki Murakami, Fussa (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 8 days.

(21) Appl. No.: 16/133,246

(22) Filed: Sep. 17, 2018

(65) Prior Publication Data

US 2019/0087617 A1    Mar. 21, 2019

(30) Foreign Application Priority Data

Sep. 20, 2017   (JP) ................ 2017-180107

(51) Int. Cl.
  *G06K 9/22*    (2006.01)
  *G06K 7/10*    (2006.01)
  *G06K 7/14*    (2006.01)

(52) U.S. Cl.
  CPC ..... *G06K 7/10762* (2013.01); *G06K 7/10881* (2013.01); *G06K 7/1413* (2013.01); *G06K 7/1439* (2013.01)

(58) Field of Classification Search
  CPC ........... G06K 7/10881; G06K 7/10891; G06K 7/2007; G06K 7/10524

(Continued)

(56) References Cited

U.S. PATENT DOCUMENTS

| 5,959,282 A | 9/1999 | Tabuchi |
| 7,258,277 B2 * | 8/2007 | Baker ................ B07C 3/14 235/375 |

(Continued)

FOREIGN PATENT DOCUMENTS

| JP | H08287181 A | 11/1996 |
| JP | H10240852 A | 9/1998 |

(Continued)

OTHER PUBLICATIONS

Japanese Office Action dated Jul. 23, 2019 (and English translation thereof) issued in counterpart Japanese Application No. 2017-180107.

(Continued)

*Primary Examiner* — Daniel St Cyr
(74) *Attorney, Agent, or Firm* — Holtz, Holtz & Volek PC

(57) ABSTRACT

A slip processing device including a scanner which irradiates a slip with a light beam and reads identification information from a barcode provided on the slip, a camera which captures an image of the slip, and a processor which functions as an information acquisition control section which starts reading of the identification information by the scanner and image capturing of the slip by the camera, in response to an information acquisition instruction from a user, and a recording control section which records the captured image of the slip in a predetermined recording section on condition that the reading of the identification information has been judged as successful.

7 Claims, 8 Drawing Sheets

(58) Field of Classification Search
USPC .......................... 235/462.45, 462.25, 462.14
See application file for complete search history.

(56) References Cited

U.S. PATENT DOCUMENTS

| | | | |
|---|---|---|---|
| 8,391,583 B1 * | 3/2013 | Mennie .................. | G07D 7/003 209/534 |
| 8,433,123 B1 * | 4/2013 | Csulits .................... | G07F 19/20 209/534 |
| 8,459,436 B2 * | 6/2013 | Jenrick .................... | G07D 7/00 194/206 |

FOREIGN PATENT DOCUMENTS

| | | |
|---|---|---|
| JP | H11349114 A | 12/1999 |
| JP | 2005275530 A | 10/2005 |

OTHER PUBLICATIONS

Japanese Office Action (and English language translation thereof) dated Jul. 22, 2020 issued in Japanese Application No. 2019-163055.

* cited by examiner

SLIP PROCESSING DEVICE, SLIP PROCESSING METHOD AND STORAGE MEDIUM

CROSS-REFERENCE TO RELATED APPLICATION

This application is based upon and claims the benefit of priority from the prior Japanese Patent Application No. 2017-180107 filed Sep. 20, 2017, the entire contents of which are incorporated herein by reference.

BACKGROUND OF THE INVENTION

1. Field of the Invention

The present invention relates to a slip processing device, a slip processing method and a storage medium.

2. Description of the Related Art

As data collection terminal devices for business use, handy terminals are known. Some of these handy terminals include a barcode scanner and a camera, and acquires identification information regarding a barcode printed on a slip and image information regarding an image of the slip captured by the camera.

Conventionally, for data management where identification information regarding a barcode printed on a slip and image information regarding the slip are associated with each other, a management method is known in which a barcode scanner reads a barcode on a slip to acquire identification information, and then a camera captures an image of the slip, whereby the identification information and the image information are stored in association with each other (Japanese Patent Application Laid-Open (Kokai) Publication No. 11-349114).

However, in the conventional management method, after a barcode is read, image capturing is performed. That is, two actions are required. Therefore, extra time and effort are consumed as compared to a case where identification information regarding a barcode is simply acquired. This problem is particularly prominent when, for example, many slips are processed.

SUMMARY OF THE INVENTION

In accordance with one aspect of the present invention, there is provided a slip processing device comprising: a scanner which irradiates a slip with a light beam and reads identification information from a barcode provided on the slip; a camera which captures an image of the slip; and a processor which functions as (i) an information acquisition control section which starts reading of the identification information by the scanner and image capturing of the slip by the camera, in response to an information acquisition instruction from a user, and (ii) a recording control section which records the captured image of the slip in a predetermined recording section on condition that the reading of the identification information has been judged as successful.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

DETAILED DESCRIPTION OF THE PREFERRED EMBODIMENTS

Figure 1:
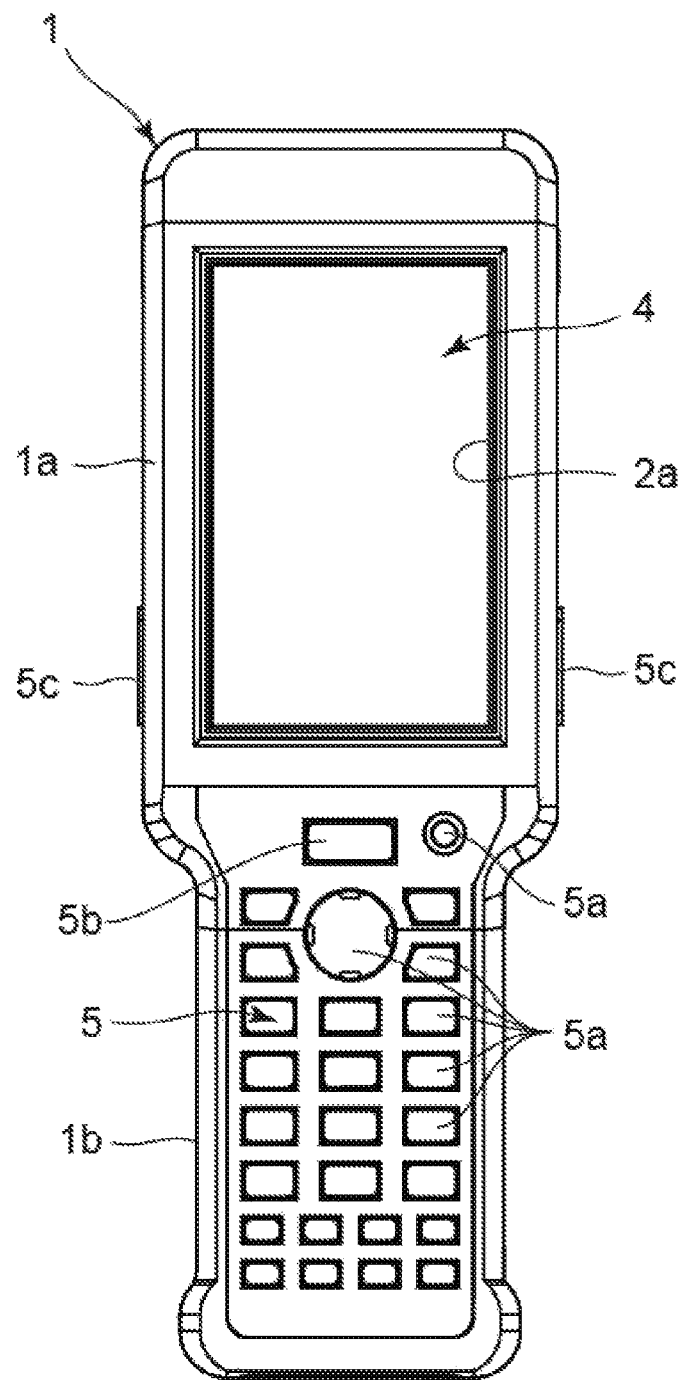
FIG. 1 is a front view of one embodiment of a handy terminal according to the present invention.
Figure 2:
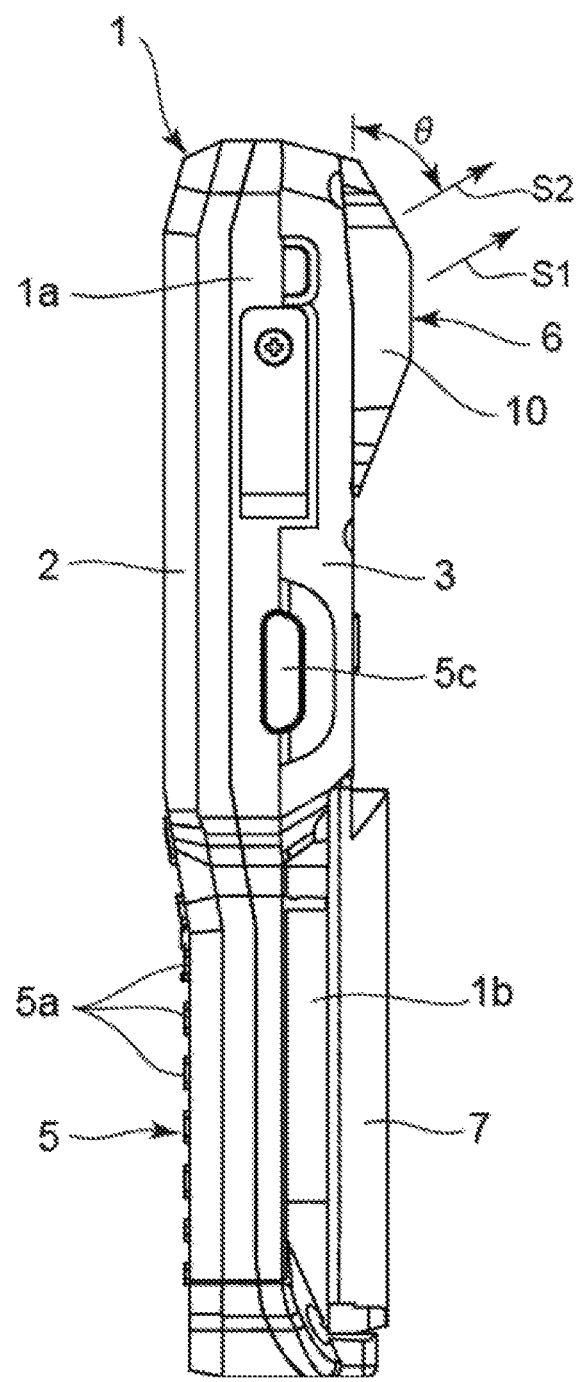
FIG. 2 is a side view of the handy terminal.
Figure 3:
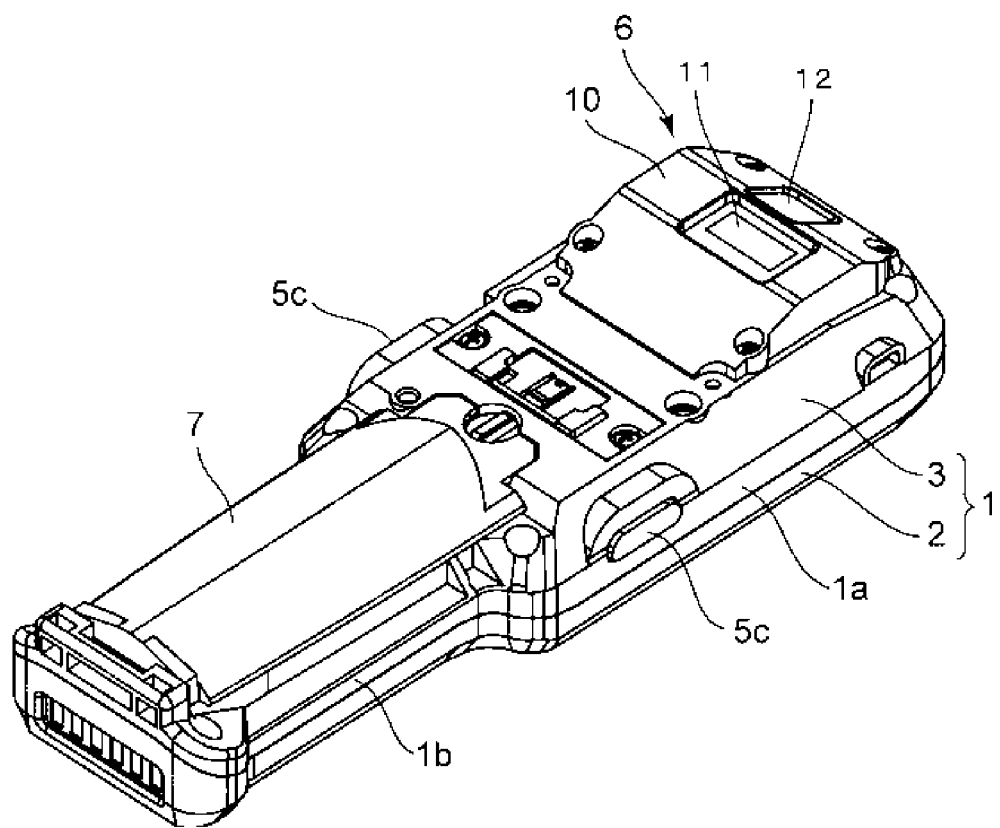
FIG. 3 is a perspective view of the rear surface side of the handy terminal.

An embodiment of the present invention will hereinafter be described. FIG. 1 to FIG. 3 are diagrams showing a handy terminal according to one embodiment of the slip processing device of the present invention.

This handy terminal has an imaging function for capturing images of targets such as various slips and articles provided with a barcode, and includes a device case 1, as shown in FIG. 1 to FIG. 3. This device case 1 is constituted by an upper case 2 and a lower case 3. The upper case 2 is provided with a display 4 and an input section 5. The lower case 3 is provided with a reading device 6 and a battery cover 7.

In the device case 1, a main body section 1a in a rectangular shape elongated in a front-and-back direction (vertical direction in FIG. 1) is formed on a tip side (upper side in FIG. 1) located on the display 4 side of the upper case 2 and the corresponding reading device 6 side of the lower case 3, a grip section 1b in a rectangular shape elongated in the front-and-back direction is formed on the frontward side (lower side in FIG. 1) located on the input section 5 side of the upper case 2 and the corresponding battery cover 7 side of the lower case 3. Also, in the device case 1, the width of the grip section 1b is narrower than the width of the main body section 1a, and the device case 1 is formed in a substantially Japanese battledore shape as a whole.

As shown in FIG. 1, the input section 5 includes various keys 5a such as numeric keys, arithmetic keys, cursor keys, an enter key, and a power supply key, which are arrayed on the upper case 2 positioned on the grip section 1b side. On the upper side of the input section 5, a center trigger key 5b is provided. On both side surfaces of the device case 1, side trigger keys 5c are provided.

The reading device 6 is constituted by a scanner and a camera provided inside a unit case 10 provided on the lower surface (upper surface in FIG. 3) of the lower case 3 corresponding to the rear surface side of the display 4. The unit case 10 is provided with a read window section 11 corresponding to the scanner and an imaging window section 12 corresponding to the camera.

The scanner of the reading device 6 is a general device which irradiates a target with laser light via the read window section 11, reads a barcode by receiving reflected light of the laser light while moving its irradiation position to a predetermined direction in a reciprocating manner, and acquires code data. The camera of the reading device 6 captures an image of the target by an image sensor via the imaging window section 12, and the image of the target or the like captured by the camera is displayed on the display 4.

Here, the handy terminal is structured such that an irradiation direction S1 of laser light and an imaging direction S2 of the camera in the reading device 6 are set to be in the same direction as shown in FIG. 2 and the light trail of the laser light reciprocating at the time of barcode reading traverses an imaging range of the camera at a predetermined position.

Figure 4:
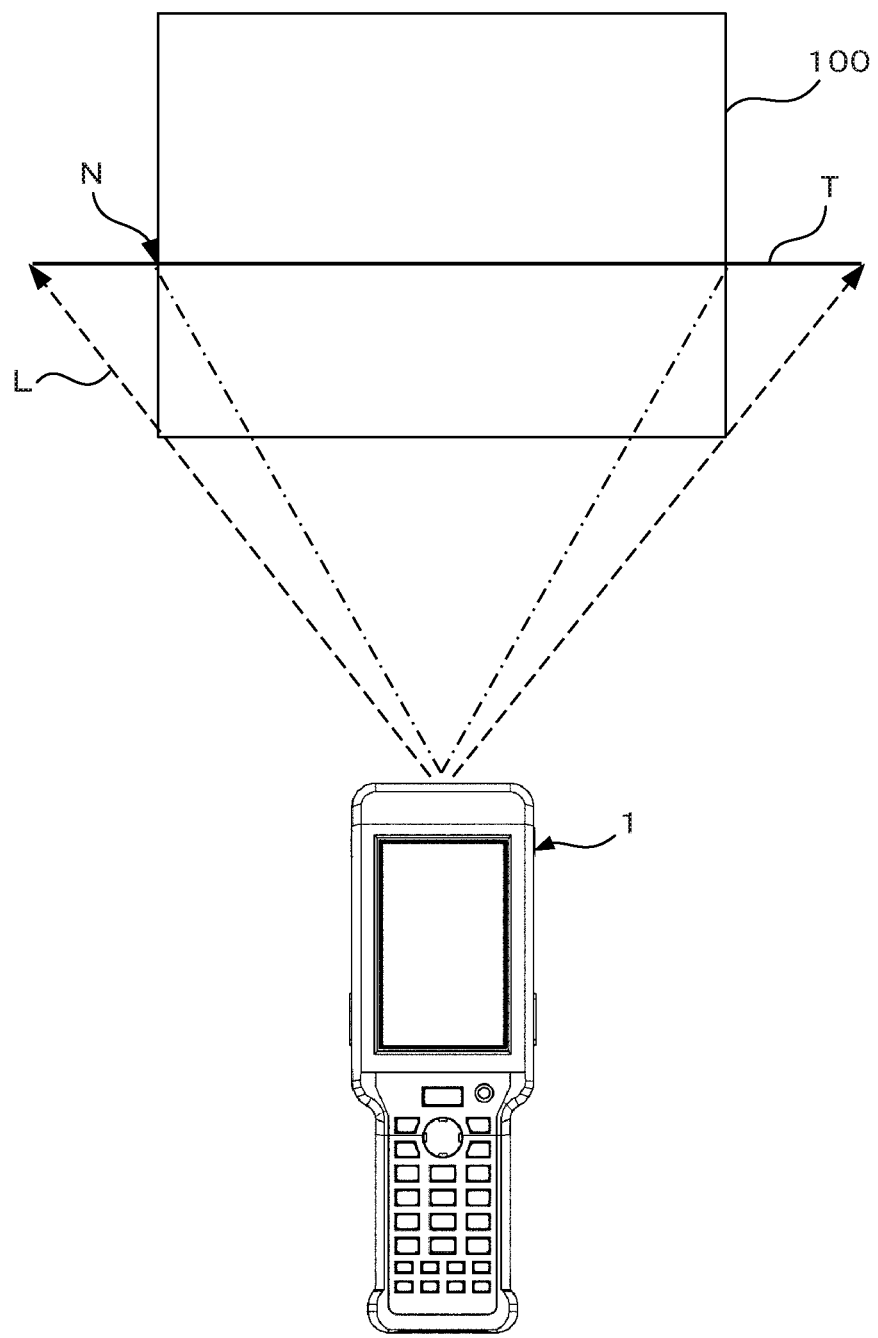
FIG. 4 is a diagram of a relation between a light trail of laser light and an imaging range of a camera at the time of barcode reading.

FIG. 4 is a diagram of a relation between the light trail T of laser light L and the imaging range 100 of the camera at the time of barcode reading. In the present embodiment, the imaging range 100 of the camera is in a longitudinally-elongated rectangular shape, the moving direction of the laser light L is a lateral direction, and its light trail T crosses the imaging range 100 at a position slightly lower than the center of the imaging range 100. Also, a crossing position N of the light trail T, that is, the position in the imaging range 100 in the vertical direction, is constant.

Also, the irradiation direction S1 of the laser light L and the imaging direction S2 of the camera keep a gradient at a predetermined angle θ with respect to the lower surface of the device case 1, that is, the lower surface of the lower case 3. The handy terminal is structured such that a user (worker) can easily perform a barcode reading operation and a target imaging operation while viewing the display 4. The predetermined angle θ is in an angle range of 40 degrees to 80 degrees, and should preferably be at 60 degrees toward the tip side (upper side in FIG. 2) of the lower case 3.

Figure 5:
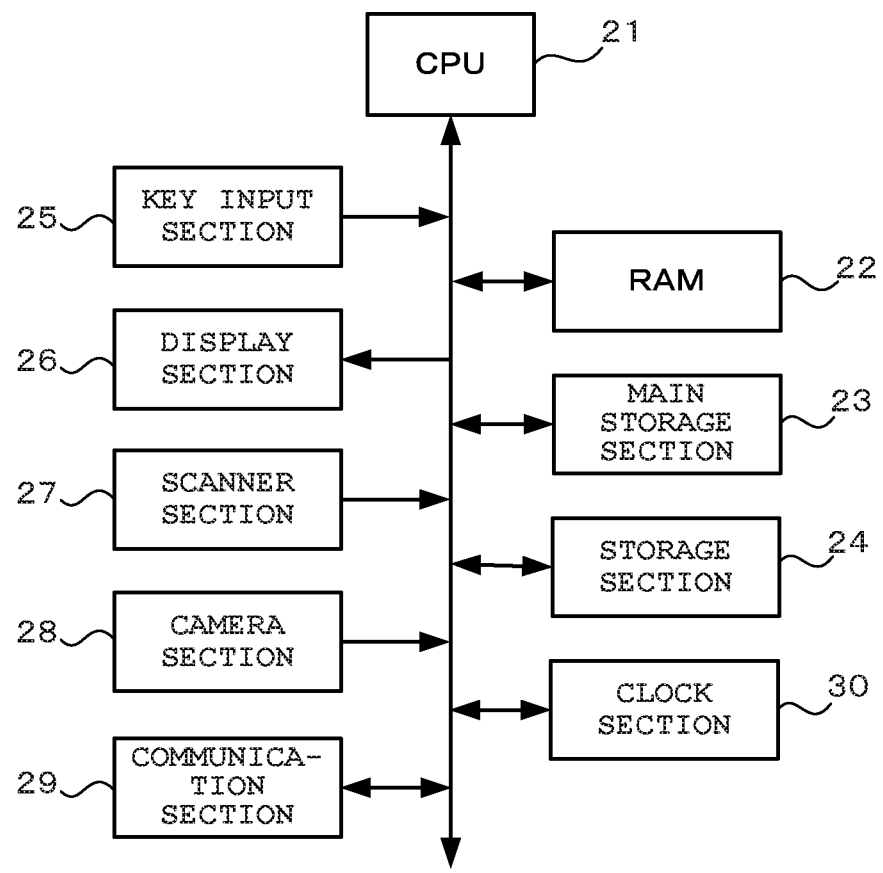
FIG. 5 is a block diagram showing an electrical structure of the handy terminal.

FIG. 5 is a schematic block diagram of an electrical structure of the handy terminal. The handy terminal is constituted by a CPU (Central Processing Unit) 21, a RAM (Random Access Memory) 22 connected to the CPU 21, a main storage section 23, a storage section 24, a key input section 25, a display section 26, a scanner section 27, a camera section 28, a communication section 29 and a clock section 30.

The main storage section 23 is constituted by a non-volatile rewritable memory such as a flash memory incorporated in the handy terminal. The main storage section 23 stores a control program, various setting information regarding operations of the handy terminal set by the user, and the like. Also, the handy terminal supports plural types of slips, and the main storage section 23 stores, in advance, information regarding plural types of slips set in advance by the user (hereinafter referred to as slip information) in addition to the control program. The slip information includes the shape (aspect ratio), actual size, barcode position and barcode type of each slip.

The CPU 21 reads the control program from the main storage section 23, develops the control program on the RAM 22, and controls operations of the handy terminal based on the developed control program. Here, the RAM 22 is used as a work memory, and various data including image data are temporarily stored in the RAM 22 as required.

The key input section 25, which includes various keys 5a (such as numeric keys, arithmetic keys, cursor keys, enter key, and power supply key), the center trigger key 5b, and the side trigger keys 5c, detects whether these keys have been operated and supplies such operation information to the CPU 21. The display section 26 is constituted by the display 4 and its drive circuit. The display 4 is, for example, an LCD (Liquid Crystal Display) or ELD (Electro Luminescent Display).

The scanner section 27 is a laser scanner module or the like accommodated in the above-described reading device 6, and includes a laser diode which emits laser light L, a movable mirror which reflects the laser light L and scans a barcode on the surface of an article by rotating within the predetermined angle, and a light-emitting element which receives irregular reflected light from the surface of the article. The scanner section 27 includes a laser control circuit which controls the light emission of the laser diode, a mirror drive circuit which drives the movable mirror, an analog signal processing circuit which processes an analog signal outputted from the light-receiving element for A/D conversion, and a decode circuit which decodes a processed digital signal to acquire code data and supplies the code data to the CPU 21.

The camera section 28 is a digital camera module or the like accommodated in the above-described reading device 6, and includes an image sensor which images a subject via an imaging lens including a focus lens. The image sensor is, for example, a CCD (Charge Coupled Device) or CMOS (Complementary Metal Oxide Semiconductor) sensor.

Although not shown, the camera section 28 includes a drive circuit which drives the image sensor, an image processing circuit which processes an imaging signal read from the image sensor, performs various signal processing such as white balance and brightness adjustment, and supplies the result as image data to the CPU 21, and an AF drive circuit which achieves an AF (Auto Focus) function by driving the imaging lens and performing focus adjustment.

The storage section 24 is constituted by, for example, a memory card attachable to and detachable from the handy terminal and a card interface capable of inputting and outputting data to the memory card. In the storage section 24, code data acquired by the scanner section 27, that is, identification information unique to a slip and image data acquired by the camera section 28 are associated with each other and stored together with other information as slip data 50 such as that shown in FIG. 6.

Figure 6:
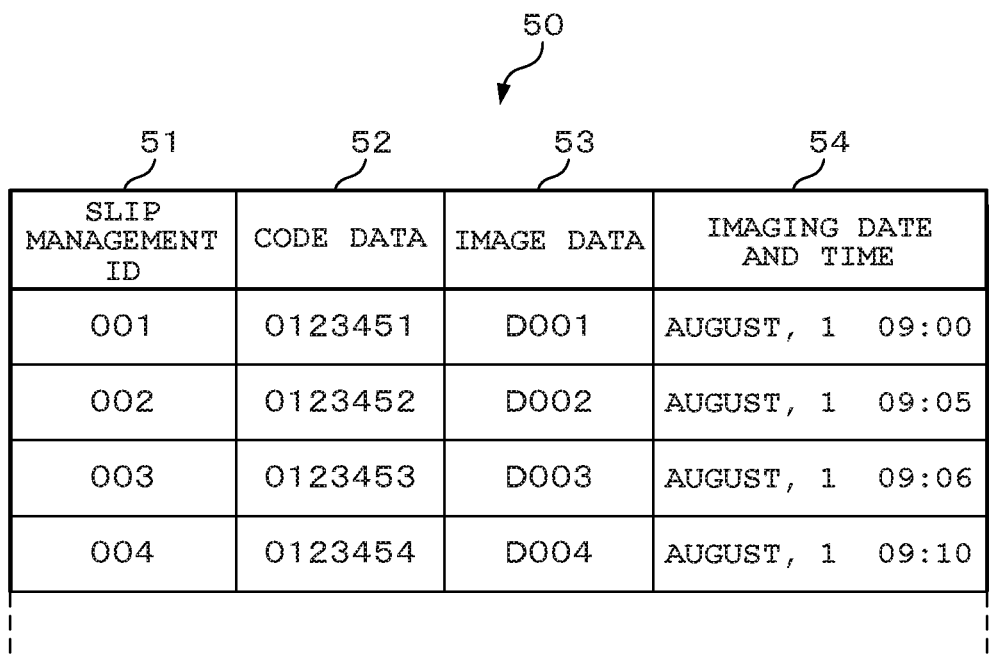
FIG. 6 is a conceptual diagram of slip data.

FIG. 6 is a conceptual diagram of slip data 50 stored in the storage section 24. The slip data 50 is constituted by data including a SLIP MANAGEMENT ID 51, CODE DATA 52, IMAGE DATA 53 and IMAGING DATE AND TIME 54. Here, the SLIP MANAGEMENT ID 51 is identification information for use in management of the slip data 50, and the IMAGING DATE AND TIME 54 is the acquisition date and time of the IMAGE DATA 53.

The communication section 29 communicates with an external information device as required wirelessly or in a wired manner, and transmits the slip data 50 stored (saved) in the storage section 24 to the external information device. The external information device is, for example, a computer or a data management server for use in management tasks such as those regarding article deliveries or inventory.

The clock section 30, which is a real-time clock having a calendar function as well as the current year, month, day and time are clocked, and which are then output as time information to the CPU 21.

Figure 7:
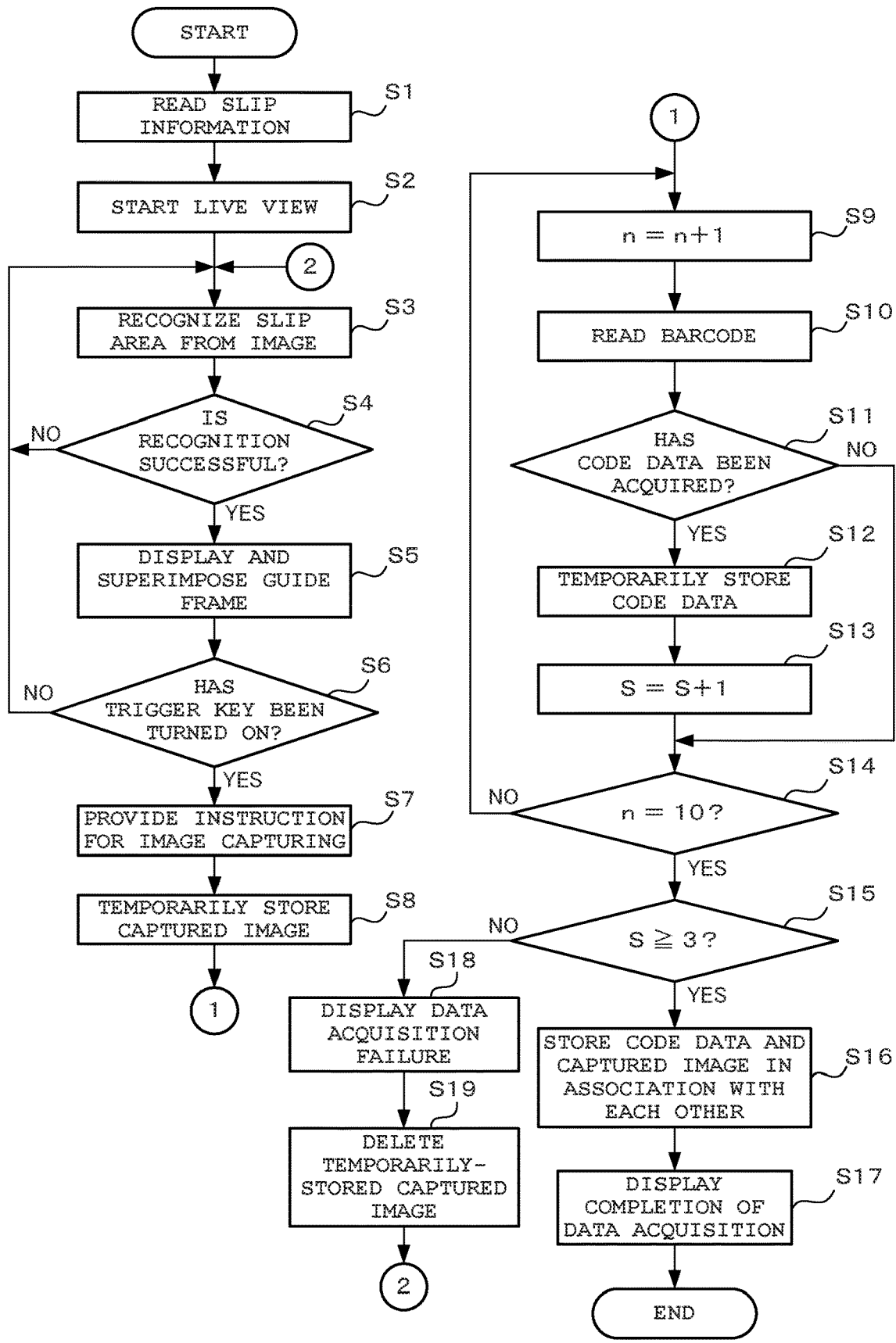
FIG. 7 is a flowchart of processing in a slip imaging mode.

Next, operations of the handy terminal when the user uses the handy terminal to acquire identification information and image information from a slip will be specifically described. FIG. 7 is a flowchart of processing in a slip imaging mode which is performed by the CPU 21 following the control program stored in the main storage section 23 in response to power-on.

In the slip imaging mode, the CPU 21 reads slip information regarding a slip specified in advance as a processing target from the main storage section 23 (Step S1). In addition, the CPU 21 starts live view display, that is, starts an operation of capturing images by the camera section 28 at a predetermined frame rate (for example, 30 fps) and displaying the captured images (hereinafter collectively referred to as a live view image) on the display 4 (Step S2). During the live view display, the camera section 28 performs focus adjustment by the AF function.

Then, the CPU 21 recognizes an area corresponding to the slip (hereinafter referred to as a slip area) from each of the sequentially captured frames (or every few frames) of the live view image (Step S3). For example, the CPU 21 performs the recognition of the slip area by performing edge detection and straight-line recognition on each frame of the live view image, detecting a plurality of rectangular areas sectioned along a plurality of recognized straight lines, and specifying a rectangular area with a maximum area as the slip area. Note that color information can be used to specify this slip area.

Figure 8A:
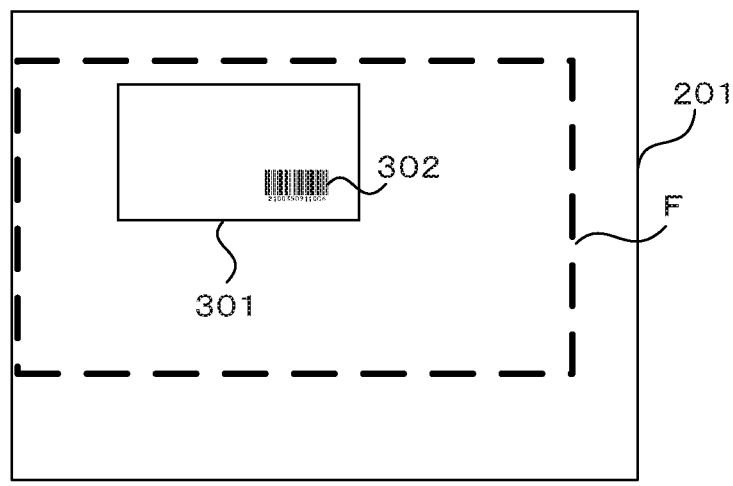
FIG. 8A to FIG. 8B are diagrams each exemplarily showing one example of a live view image.

When the slip area is recognized (YES at Step S4), the CPU 21 uses an OSD (On Screen Display) function to cause a guide frame to be displayed and superimposed on a predetermined position on the live view image (Step S5). FIG. 8A is a diagram showing one example of this live view image 201 in which a slip 301 serving as an imaging target is present and on which a guide frame F has been displayed. The guide frame indicates to the user the size and position of the slip 301 on the live view image 201 which are required for capturing an image of the slip 301.

The size indicated by the guide frame F is a minimum size with which a predetermined resolution (pixel size) can be achieved in a slip 301 portion of a captured image showing the slip 301. The position indicated by the guide frame F is a position corresponding to the position of the light trail T of laser light L (refer to FIG. 4) during the reading of a barcode. In processing at Step S5, in the case of a configuration where the number of effective pixels of the image sensor or the number of pixels for images to be recorded in the camera section 28 is selectable, the shape, size, and display position of the guide frame F are determined based on the currently set number of pixels and slip information set for a slip serving as a processing target that is, the shape (aspect ratio), actual size, and barcode position of the slip.

After causing the guide frame F to be displayed on the live view image 201, the CPU 21 sequentially judges whether the trigger key (center trigger key 5b or one of the side trigger keys 5c) has become in an ON state, that is, whether the trigger key has been pressed by the user (Step S6). During that time, the user makes adjustments by following the size and position of the slip 301 and the guide frame F on the live view image 201.

In the end, when the trigger key is pressed by the user (YES at Step S6), the CPU 21 instructs, in response thereto, the camera section 28 to capture an image so that the camera section 28 performs an imaging operation for acquiring a recording-purpose image, that is, a photographing operation (Step S7), and temporarily stores the data of the image acquired by the camera section 28 in the RAM 22 (Step S8). Here, the CPU 21 acquires current time information from the clock section 30, and temporarily stores the current time information in association with the data of the captured image in the RAM 22.

Subsequently, after incrementing a count value n which has been initially set at "0" at the start of the processing and is indicating the number of times a barcode reading operation has been operated (Step S9) the CPU 21 instructs the scanner section 27 to read the barcode, and thereby causes the scanner section 27 to perform a series of reading operations including laser light irradiation, scanning of the barcode with the irradiated laser light, and decoding of code data (Step S10).

Figure 8B:
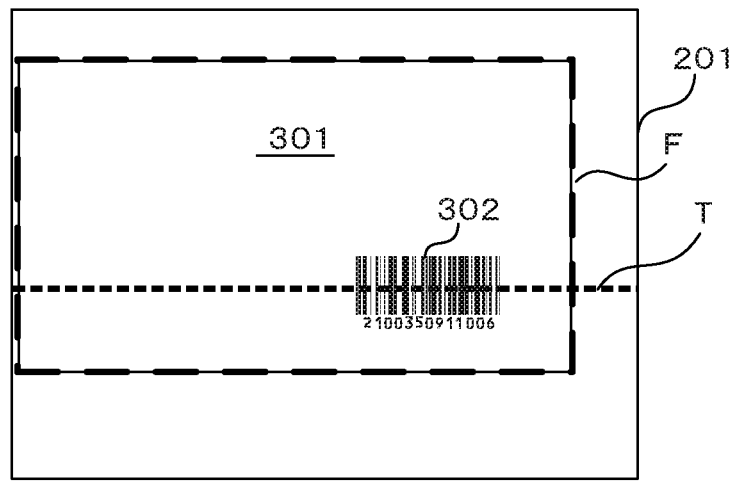

FIG. 8B is a diagram showing one example of the live view image 201 immediately after this barcode reading operation is started by the scanner section 27. On the live view image 201 during the read operation, the light trail T of laser light is displayed.

When code data is acquired by the scanner section 27 (YES at Step S11), the CPU 21 temporarily stores the acquired code data in the RAM 22 (Step S12), and increments a count value S which has been initially set at "0" at the start of the processing and is indicating the number of times code data has been successfully acquired (Step S13). The CPU 21 then returns to the processing at Step S9 to repeat the processing thereafter unless the number of times a barcode reading operation has been performed reaches ten (n=10) (NO at Step S14).

When code data cannot be acquired by the scanner section 27 (NO at Step S11), the CPU 21 immediately returns to the processing at Step S9 to repeat the processing thereafter unless the number of times a barcode reading operation has been performed reaches ten (NO at Step S14).

In the end, when the number of times a barcode reading operation has been performed reaches ten (n=10) (YES at Step S14), the CPU 21 judges whether the number of times code data has been successfully acquired is three or more (Step S15).

When the number of times code data has been successfully acquired is three or more (YES at Step S15), the CPU 21 finally judges that the barcode reading has been successfully performed, and stores the captured image data and the code data temporarily stored in the RAM 22, in the storage section 24 in association with each other (Step S16). That is, the CPU 21 stores the captured image data and the code data together with other data as new slip data 50 in the storage section 24. The CPU 21 then causes the completion of the data (code data and captured image data) acquisition to be displayed on the display 4 (Step S17) and thereby ends one reading operation.

On the other hand, when the number of times code data has been successfully acquired is less than three (NO at Step S15), the CPU 21 finally judges that the barcode reading has failed, and causes the failure of the data (code data and captured image data) acquisition to be displayed on the display 4 (Step S18) so as to prompt the user to perform a data acquisition operation again and the like. Also, after deleting the captured image temporarily stored in the RAM 22 (Step S19), the CPU 21 returns to the processing at Step S3 to repeat the processing thereafter.

As described above, in the present embodiment, when the user presses the trigger key (center trigger key 5b or one of the side trigger keys 5c) once, both a barcode reading operation and a slip imaging operation are performed in response thereto. As a result of this configuration, in the case of data management where the identification information (code data) of a barcode printed on a slip and image information (captured image data) of the slip are associated with each other, the operability of slip processing required for the data management can be improved. This effect is particularly significant when many slips are processed.

Also, as for barcode reading, the scanner section 27 performs a read operation a plurality of times (ten times in the above-described example) and, on condition that code data has been successfully acquired more than a defined number of times (three or more in the above-described example), captured image data is associated with the code data for storage in the storage section 24. Accordingly, even in a case where barcode reading may fail by a slight difference in the irradiation angle of laser light due to, for example, asperity or stains on a barcode portion of a slip, code data can be more reliably acquired. As a result, operability in slip processing can be more improved.

In the present embodiment a slip imaging operation is performed in response to an operation on the trigger key, and then a barcode reading operation is performed. However, these operations may be concurrently performed at the same timing. In this case, for example, by the irradiation of laser light by the scanner section 27 being temporarily stopped only in an exposure period of the image sensor during an imaging operation by the camera section 28, the light trail of the laser light can be prevented from being reflected on a captured image.

While the present invention has been described with reference to the preferred embodiments it is intended that the invention be not limited by any of the details of the description therein but includes all the embodiments which fall within the scope of the appended claims.

What is claimed is:

1. A slip processing device comprising:
    a scanner which irradiates a slip with a light beam and reads identification information from a barcode provided on the slip;
    a camera which captures an image of the slip;
    a processor which executes processing comprising:
        (i) information acquisition control processing for starting image capturing of the slip by the camera and reading of the identification information by the scanner, in response to an information acquisition instruction from a user, and
        (ii) recording control processing for recording the captured image of the slip in a predetermined recording section on condition that the reading of the identification information has been judged as successful,
    wherein, in the information acquisition control processing, the image capturing of the slip by the camera is started prior to the reading of the identification information by the scanner; and
    a display where images acquired via the camera are displayed as a live view image during standby for the information acquisition instruction,
    wherein the processor executes further processing comprising:
        (iii) judging processing for judging whether the slip is included in the live view image, and
        (iv) display control processing for, when it is judged that the slip is included in the live view image, displaying, on the display, an indication providing guidance regarding a position adjustment operation for adjusting a position of the barcode on the live view image to correspond to a position of the light beam.

2. The slip processing device according to claim 1, wherein, in the recording control processing, when the reading of the identification information by the scanner is successful, the processor records, in the predetermined recording section, the identification information in association with the captured image, and, when the reading of the identification information by the scanner has failed, the processor discards the captured image.

3. The slip processing device according to claim 1, wherein, in the recording control processing, the processor performs, a plurality of times, decoding processing based on reflected light of the light beam with which the barcode has been irradiated, and records the captured image of the slip in the predetermined recording section on condition that the barcode can be decoded a predetermined number of times or more by the decoding processing.

4. The slip processing device according to claim 1, wherein, in the recording control processing, the processor records, in the predetermined recording section, the captured image of the slip in association with the identification information.

5. The slip processing device according to claim 1, wherein the processor executes processing comprising:
    clocking processing for clocking current year, month, day and time as current time information,
    wherein, in the recording control processing, the captured image of the slip is recorded in the predetermined recording section in association with the acquired identification information and the current time information when the captured image has been captured.

6. A slip processing method for a slip processing device including (i) a scanner which irradiates a slip with a light beam and reads identification information from a barcode provided on the slip, (ii) a camera which captures an image of the slip, and (iii) a display, the method comprising:
    an information acquisition control step of starting image capturing of the slip by the camera and reading of the identification information by the scanner, in response to an information acquisition instruction from a user; and
    a recording control step of recording the captured image of the slip in a predetermined recording section on condition that the reading of the identification information has been judged as successful,
    wherein, in the information acquisition control step, the image capturing of the slip by the camera is started prior to the reading of the identification information by the scanner,
    wherein images acquired via the camera are displayed on the display as a live view image during standby for the information acquisition instruction, and
    wherein the method further comprises:
        a judging step of judging whether the slip is included in the live view image; and
        a display control step of, when it is judged that the slip is included in the live view image, displaying, on the display, an indication providing guidance regarding a position adjustment operation for adjusting a position of the barcode on the live view image to correspond to a position of the light beam.

7. A non-transitory computer-readable storage medium having stored thereon a program that is executable by a processor of a slip processing device, the slip processing device including (i) a scanner which irradiates a slip with a light beam and reads identification information from a barcode provided on the slip, (ii) a camera which captures an image of the slip, and (iii) a display, the program causing the processor to execute:
    information acquisition control processing for starting image capturing of the slip by the camera and reading of the identification information by the scanner, in response to an information acquisition instruction from a user; and
    recording control processing for recording the captured image of the slip in a predetermined recording section on condition that the reading of the identification information has been judged as successful,
    wherein, in the information acquisition control processing, the image capturing of the slip by the camera is started prior to the reading of the identification information by the scanner, wherein images acquired via the camera are displayed on the display as a live view image during standby for the information acquisition instruction, and wherein the program causes the processor to further execute:
- judging processing for judging whether the slip is included in the live view image; and
- display control processing for, when it is judged that the slip is included in the live view image, displaying, on the display, an indication providing guidance regarding a position adjustment operation for adjusting a position of the barcode on the live view image to correspond to a position of the light beam.

* * * * *